(12) United States Patent
Nakayama

(10) Patent No.: US 7,365,306 B2
(45) Date of Patent: *Apr. 29, 2008

(54) STANDARD MEMBER FOR LENGTH MEASUREMENT, METHOD FOR PRODUCING THE SAME, AND ELECTRON BEAM LENGTH MEASURING DEVICE USING THE SAME

(75) Inventor: Yoshinori Nakayama, Sayama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 51 days.

This patent is subject to a terminal disclaimer.

(21) Appl. No.: 10/544,668

(22) PCT Filed: Apr. 28, 2003

(86) PCT No.: PCT/JP03/05438

§ 371 (c)(1),
(2), (4) Date: May 3, 2006

(87) PCT Pub. No.: WO2004/074771

PCT Pub. Date: Sep. 2, 2004

(65) Prior Publication Data

US 2006/0237644 A1    Oct. 26, 2006

(30) Foreign Application Priority Data

Feb. 19, 2003  (JP) .............................. 2003-040669

(51) Int. Cl.
*G01N 23/00* (2006.01)
*G21K 7/00* (2006.01)

(52) U.S. Cl. .................. 250/252.1; 250/306; 250/307; 250/310; 250/311

(58) Field of Classification Search ................ 250/307, 250/310, 252.1

See application file for complete search history.

(56) References Cited

U.S. PATENT DOCUMENTS 5,822,875 A  *  10/1998  Feldner .................... 33/494

(Continued)

FOREIGN PATENT DOCUMENTS

EP      0 519 693 A1     12/1992

(Continued)

*Primary Examiner*—Jack I. Berman
*Assistant Examiner*—Bernard Souw
(74) *Attorney, Agent, or Firm*—Antonelli, Terry, Stout & Kraus, LLP.

(57) ABSTRACT

This invention provides an electron beam length measuring technology including a standard component for length measurement that has a finer standard dimension, and its producing method. The standard component for length measurement has a semiconductor member on which is arranged a pattern consisting of an array of first diffraction gratings whose pitch dimension is specified as an absolute dimension by an optical measurement method, wherein the pattern has a structure in which an array of second diffraction gratings different from the first diffraction gratings is arranged in a portion within the array of the first diffraction gratings in a predetermined cycle. Each one of the first diffraction gratings and the second diffraction gratings has a predetermined length and a predetermined width, respectively. The first diffraction gratings and the second diffraction gratings are arranged cyclically at respective predetermined intervals, and marks for specifying positions of the above-mentioned patterns are arranged in peripheral portions of the above-mentioned patterns. Moreover, the above-mentioned pattern contains an array pattern whose minimum pitch dimension is equal to or less than 100 nm. The electron beam batch exposure method is used as a pattern producing method.

15 Claims, 12 Drawing Sheets

U.S. PATENT DOCUMENTS

| | | | |
|---|---|---|---|
| 5,825,670 A * | 10/1998 | Chernoff et al. | 702/85 |
| 5,920,067 A * | 7/1999 | Cresswell et al. | 250/306 |
| 6,016,684 A * | 1/2000 | Scheer et al. | 73/1.89 |
| 6,351,304 B1 * | 2/2002 | Kawashima et al. | 355/55 |
| 6,459,482 B1 * | 10/2002 | Singh et al. | 356/243.1 |
| 6,515,296 B1 * | 2/2003 | Komatsu et al. | 250/559.44 |
| 6,570,157 B1 * | 5/2003 | Singh et al. | 250/311 |
| 6,653,634 B1 * | 11/2003 | Otaka et al. | 250/311 |
| 6,807,314 B1 * | 10/2004 | Nikitin et al. | 382/255 |
| 6,978,215 B2 * | 12/2005 | Nikitin | 702/95 |
| 7,054,000 B2 * | 5/2006 | Nikitin et al. | 356/243.1 |
| 7,078,691 B2 * | 7/2006 | Nakayama | 250/311 |
| 7,209,596 B2 * | 4/2007 | Nikitin | 382/255 |
| 7,236,651 B2 * | 6/2007 | Ishitani et al. | 382/299 |
| 2002/0158193 A1 * | 10/2002 | Sezginer et al. | 250/237 G |
| 2005/0184234 A1 * | 8/2005 | Nakayama | 250/311 |
| 2005/0189501 A1 * | 9/2005 | Sato et al. | 250/492.22 |
| 2005/0199811 A1 * | 9/2005 | Ishitani et al. | 250/311 |
| 2006/0151697 A1 * | 7/2006 | Inada et al. | 250/310 |
| 2006/0237644 A1 * | 10/2006 | Nakayama | 250/307 |
| 2006/0289756 A1 * | 12/2006 | Nakayama | 250/310 |
| 2007/0114449 A1 * | 5/2007 | Nakayama | 250/491.1 |

FOREIGN PATENT DOCUMENTS

| | | |
|---|---|---|
| JP | 64-32107 | 2/1989 |
| JP | 4-289411 | 10/1992 |
| JP | 7-71947 | 3/1995 |
| JP | 8-31363 | 2/1996 |
| JP | 8-285502 | 11/1996 |

* cited by examiner

ENLARGED VIEW

ENLARGED VIEW

ENLARGED VIEW

STANDARD MEMBER FOR LENGTH MEASUREMENT, METHOD FOR PRODUCING THE SAME, AND ELECTRON BEAM LENGTH MEASURING DEVICE USING THE SAME

TECHNICAL FIELD

This invention relates to an electron-beam length measuring technology including a standard component (or a reference sample) for length measurement used for electron-beam metrology.

BACKGROUND ART

The standard component for length measurement used for the conventional electron-beam metrology has used a diffraction grating fabricated by laser interferometer lithography and anisotropic chemical etching on a semiconductor substrate having a surface of plane direction of the (110) plane. A calibration method of it is performed by diffraction angle measurement of the diffraction grating using laser light (for example, see Japanese Patent Application Laid-Open No. 7-71947).

The minimum dimension that is achievable with above-mentioned conventional standard component depends on a resolution limit of the laser interferometer lithography method; one half of a wavelength of the laser light used is the limit of a pitch dimension. With the use of an Ar ion laser of a wavelength of 351.1 nm currently used in the laser interferometer lithography equipment, a pitch dimension of about 200 nm is the limit. On the other hand, exposure equipment in which the laser light source is changed to a short wavelength light source has many technical problems and its development is difficult. At the same time, diffraction angle measurement of a diffraction grating using laser light used for calibration has also a measurement limit; for the minimum pitch dimension of about 200 nm or less, measurement is difficult.

However, since miniaturization of the semiconductor device has been accelerated, the minimum processing dimension is breaking 100 nm. In order to control dimensions of this fine processing, the electron-beam metrology system is being used, and in order to manage absolute precision of this system, a dimensional standard component is indispensable. However, the conventional dimensional standard component is becoming unable to support the minimum processing dimension of the latest semiconductor devices.

In addition, diffraction grating patterning using the laser interferometer lithography method can basically produce only simple line-and-space patterns. For this reason, the same pattern is rendered over the whole surface of the sample, and consequently automatic defining of the position cannot be done for samples in which no alignment mark is used. Therefore, it is not possible to specify exactly which diffraction grating pattern was used at the time of calibration of the electron-beam metrology system. In the case of the electron-beam metrology system, contamination adhesion associated with beam irradiation causes variation in dimensions of a sample. If the automatic alignment is impossible, it is necessary to perform calibration through the mediation of a human operator, and so automatic calibration cannot be performed.

DISCLOSURE OF THE INVENTION

The object of this invention is to provide an electron-beam length measuring technology that contains a standard component (or a reference sample) for length measurement having a finer standard dimension, and a producing method for the standard component.

In order to attain the above-mentioned objects, in this invention, the standard component has a structure of the conventional diffraction grating pattern having a finer pattern in it.

The conventional diffraction grating pattern (an array of first diffraction gratings) is specified about 200 nm or more, and the pitch dimension is used as an absolute dimension by diffraction angle measurement of the diffraction grating using laser light. A grating pattern (array of second diffraction gratings) whose minimum dimension is equal to or less than 100 nm is mixed in this diffraction grating pattern. A dimension of this pattern cannot be determined by the conventional diffraction angle measurement of the diffraction grating using the laser light; therefore, the electron-beam metrology system or the scanning probe microscope is used and a pitch dimension of the conventional diffraction grating pattern found in the above procedure as an absolute dimension value is used as a standard. In this determination, by arranging both patterns in the same scanning range of an electron beam or a scanning probe, higher-precision calibration becomes possible. In this way, by mixing a pattern whose diffraction grating can be measured by the conventional diffraction angle measurement using laser light and a fine pattern that corresponds to the minimum processing dimension of the latest semiconductor devices, the standard component for length measurement and calibration in which fineness is compatible with high-precision becomes possible.

In production of this dimension standard component, it is impossible to mix the conventional diffraction grating pattern and a fine pattern corresponding to a minimum processing size of the latest semiconductor device by the laser interferometer lithography method that is used in the conventional dimension standard component, in terms of resolution and freedom in pattern creation.

In order to solve this problem, the electron-beam exposure method that is excellent in resolution and has no limitation in pattern shape is used. Especially, in order to produce a high-precision dimension standard component whose uniformity within a sample surface is improved, electron-beam cell projection method where a desired pattern is made on a stencil mask and reduction projection exposure is conducted with an electron beam is effective. That is, because a drawing pattern has all been made in the stencil mask, exposure is done repeatedly with this mask while the beam is deflected each time, whereby patterning with excellent reproducibility can be conducted without causing any variation in dimensions at each shot. By combining this patterning method and wet chemical etching that has etching dependency on a plane direction and is used for the conventional dimension standard component, it becomes possible to produce a dimension standard component suitable for the electron-beam metrology system and the scanning probe microscope.

Since this producing method allows large freedom in production of a pattern within the stencil mask, it is possible to make not only a diffraction grating but various patterns. Then, a diffraction grating pattern is prepared in an area smaller than a maximum exposure area when cell projection is done. A stencil mask in which a diffraction grating pattern exists together with cross mark patterns in the surrounding of the diffraction grating and, at the same time, in an area of the maximum irradiation area is produced, and exposure is conducted by the electron-beam cell projection method. By this, the exposure is conducted in such a manner that: a pattern containing the diffraction gratings is exposed to be a fixed length and to be a fixed width, this pattern is arranged cyclically in longitudinal and horizontal directions at fixed intervals, respectively, and the cross mark patterns are arranged between the patterns. Moreover, position detection mark patterns, such as cross mark patterns, are formed by the same electron-beam cell projection method or the electron-beam variable shaping method in pair positions—up side and down side, or right side and left side—in the outside of a group of patterns arranged cyclically at the fixed intervals.

In the sample produced by such exposure, when the electron-beam metrology system etc. is calibrated, it is possible to automatically specify positions of a pattern used for the calibration, because sample rotation correction and specification of calibration positions within the pattern can be specified by using the position detection marks, such as a cross mark pattern. Then, the following scheme is possible: a procedure from pattern alignment to system calibration is automated, the number of beam irradiation of the pattern used in the calibration is recorded, and if the number reaches a fixed number, the field of view is moved to a different pattern position automatically and the calibration is done. By virtue of this scheme, degradation in calibration precision due to adhesion of contamination to the sample caused by beam irradiation does not occur, and an excellent signal waveform can be obtained always at the time of measurement; therefore, high-precision calibration can be attained automatically.

Moreover, since a direction of the diffraction grating can be set to an arbitrary direction by combining the patterning method based on the electron-beam cell projection method and dry etching, in a wafer-shaped standard component of a large area, a plurality of groups of patterns containing diffraction gratings and alignment marks can be arranged on the above-mentioned wafer. At this time when patterning is conducted by the electron-beam cell projection method, it is possible to prepare a group of patterns that is obtained by rotating a group of patterns by 90 degrees or 45 degrees. The use of this standard component makes it possible to calibrate dimensions in longitudinal, horizontal, and oblique directions for one sample.

Hereafter, typical configuration examples of this invention will be described.

(1) A standard component for length measurement, comprising a semiconductor member on which a pattern consisting of an array of first diffraction gratings whose pitch dimension is specified as an absolute dimension by an optical measurement method, characterized in that the pattern has a structure that contains an array of the second diffraction grating different from the first diffraction grating in a predetermined cycle in a portion within the array of the first diffraction gratings.

(2) A standard component for length measurement, comprising a semiconductor member on which a pattern consisting of an array of first diffraction gratings whose pitch dimension is specified as an absolute dimension by an optical measurement method, characterized in that the pattern has a structure that contains an array of the second diffraction grating that is different from the first diffraction grating in terms of at least one of the length of a straight line part of the first diffraction grating, a pitch dimension of the array, and a direction in which the second diffraction grating is repeated cyclically in such a way that the array of the second diffraction grating is parallel to the array of the first diffraction grating.

(3) A standard component for length measurement, comprising a semiconductor member on which plurality of patterns each consisting of an array of first diffraction gratings whose pitch dimension is specified as an absolute dimension by an optical measurement method, wherein each of the patterns has a structure that an array of second diffraction gratings different from the first diffraction gratings is arranged in a part within the array of the first diffraction gratings in a predetermined cycle.

(4) The above-mentioned standard component for length measurement, characterized in that the pattern contains an array pattern whose minimum pitch dimension is equal to or less than 100 nm.

(5) The above-mentioned standard component for length measurement, characterized in that the semiconductor member is made up of a Si substrate, and the pattern is a depression-and-projection-shaped pattern that has surfaces of plane directions of the (110) plane and the (111) plane of the Si substrate.

(6) The above-mentioned standard component for length measurement, characterized in that the first diffraction grating and the second diffraction grating have predetermined lengths and widths, respectively, and are arranged cyclically at predetermined intervals, respectively, and marks for specifying positions of the patterns are arranged in peripheral portions of the pattern.

(7) The above-mentioned standard component for length measurement, characterized in that the plurality of patterns are arranged two-dimensionally and cyclically at predetermined intervals within a predetermined area, and marks for position detection are arranged between the adjacent patterns of the plurality of patterns.

(8) A method for producing a standard component for length measurement, comprising the step of forming a pattern consisting of an array of first diffraction gratings whose pitch dimension is specified as an absolute dimension by an optical measurement method on a surface of a semiconductor member, characterized by further comprising the step of forming an array of second diffraction gratings different from the first diffraction gratings in a predetermined cycle in a part within the array of the first diffraction gratings in the pattern by the electron-beam batch exposure method using a stencil mask.

(9) An electron-beam metrology system comprising: electron beam length measuring means for measuring processing dimensions of a sample by irradiating and scanning an electron beam; and calibrating means for calibrating a dimension based on a secondary electron signal waveform obtained by scanning the electron beam on a standard component for length measurement; characterized in that the standard component for length measurement has an array of first diffraction gratings whose pitch dimension was specified by an optical measurement method as an absolute dimension on a semiconductor substrate, and has a pattern that contains an array of second diffraction gratings different from the first diffraction gratings in a predetermined cycle in a part within the array of the first diffraction gratings.

(10) A method of calibrating a standard component for length measurement that consists of a plurality of patterns containing a diffraction grating pattern having a fixed pitch dimension, characterized in that for calibration of a pitch dimension of the diffraction grating pattern, diffraction angle measurement using laser light is used, and for calibration of dimensions of other patterns, an electron-beam metrology system or a scanning probe microscope that was calibrated by the pitch dimension of the diffraction grating pattern found by the above-mentioned diffraction angle measurement is used.

(11) A method of calibrating a metrology system by using a semiconductor member having diffraction grating patterns and mark patterns for position detection, characterized in that: the mark is detected and its position is found; a portion that is in a diffraction grating pattern that has this mark position used for calibration as a standard and, at the same time, the part wherein its pitch dimension was found in advance by diffraction grating measurement using laser light is aligned; a pitch dimension of the diffraction grating pattern part is measured; this result is subjected to dimensional calibration using the pitch dimension found by the diffraction angle measurement as a standard; and the number of calibration in the pattern position is recorded, and if the number exceeds a fixed number, other pattern position is aligned with respect to the mark position and the calibration is performed.

(12) The above-mentioned method of calibrating a metrology system, characterized in that a plurality of pitch dimensions that are found by a single scan of electron beam scanning are obtained when finding a pitch dimension of the diffraction grating pattern, the pitch dimensions are averaged, and the averaged pitch dimension is used for calibration.

(13) The above-mentioned method of calibrating a metrology system, characterized in that in the semiconductor member, a part within the diffraction grating pattern contains a diffraction grating pattern that is different from the above-mentioned diffraction grating in terms of at least one of the length of its straight line part, its pitch dimension, and a periodical repeating direction; apart on which diffraction angle measurement using laser light was conducted in advance and whose pitch dimension was found is aligned; a pitch dimension of the diffraction grating pattern part is measured; after performing dimensional calibration on this result using a pitch dimension found by the diffraction angle measurement as a standard, the position just under the electron beam is shifted to a position of the different diffraction grating pattern using the mark position as a standard and the dimension of the different diffraction grating is measured; and this dimension value is used for dimensional calibration of length measurement of another pattern as a standard value.

(14) The above-mentioned method of calibrating a metrology system, characterized in that a series of the calibration operations are memorized in a controller of the metrology system and calibration is performed automatically.

BEST MODE FOR CARRYING OUT THE INVENTION

Hereafter, embodiments of this invention will be described with reference to the drawings.

Figure 1:
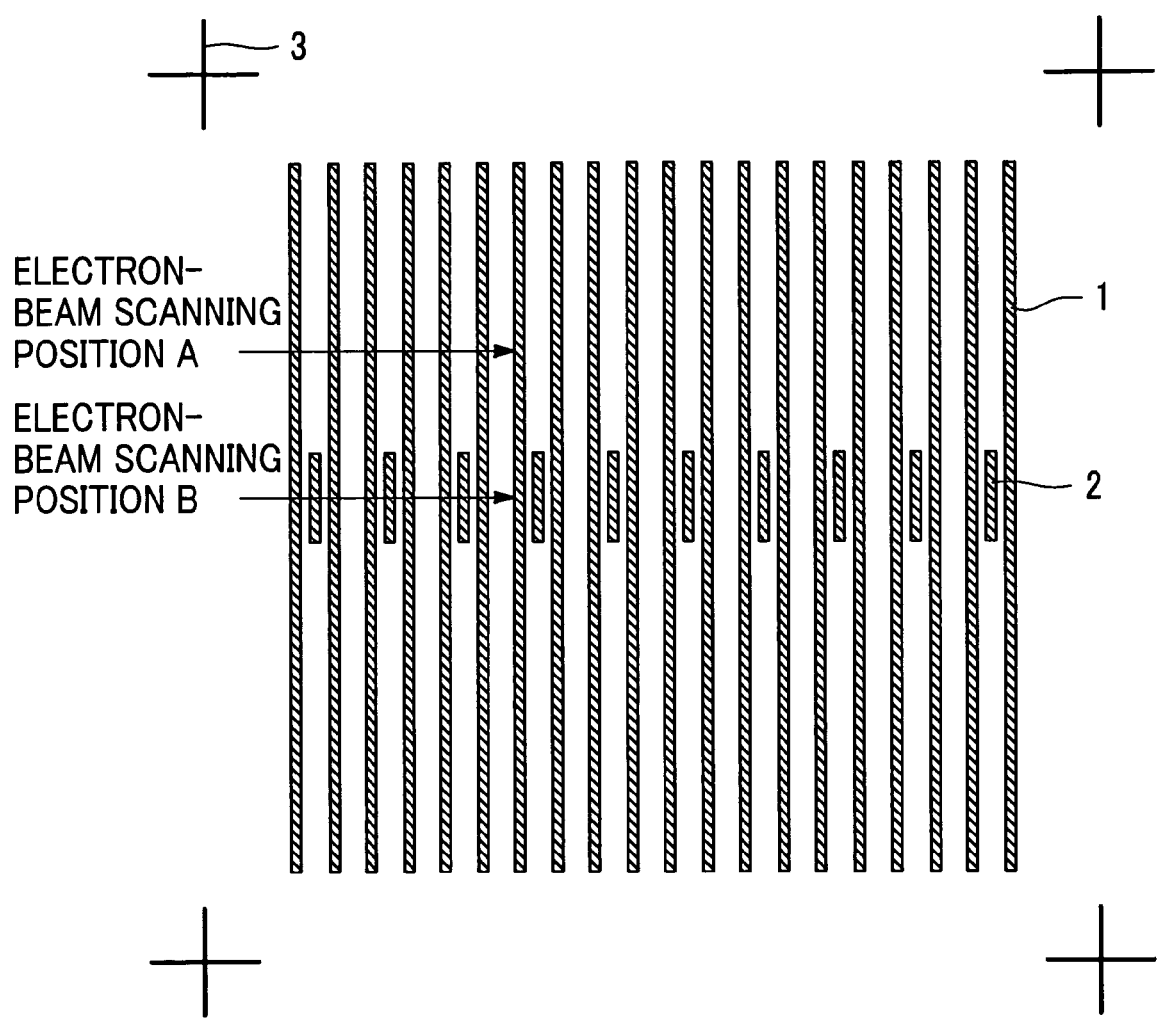
FIG. 1 is a view illustrating one example of a pattern for calibration in a dimension standard component for length measurement of this invention and a beam scan position B.
Figure 2:
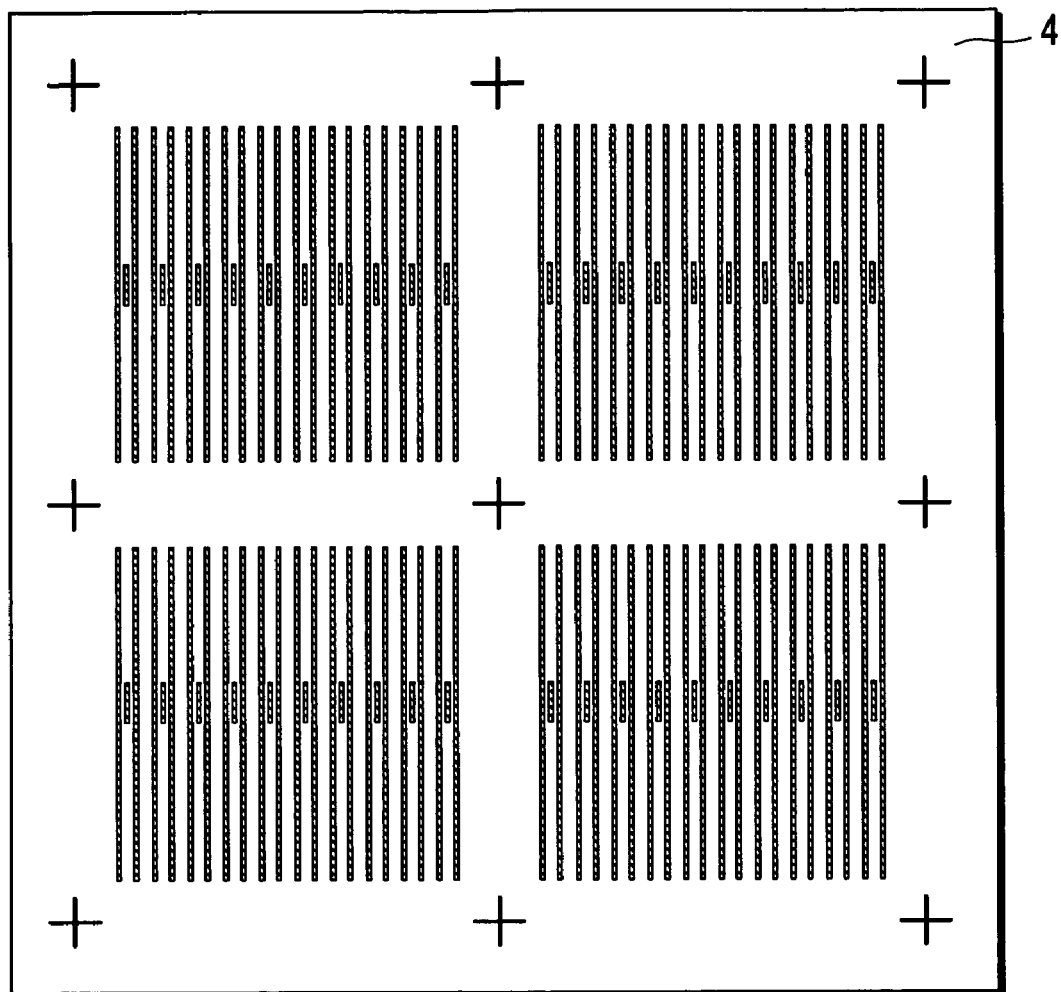
FIG. 2 is a view illustrating one example of a pattern array in the dimension standard component for length measurement of this invention.
Figure 2:
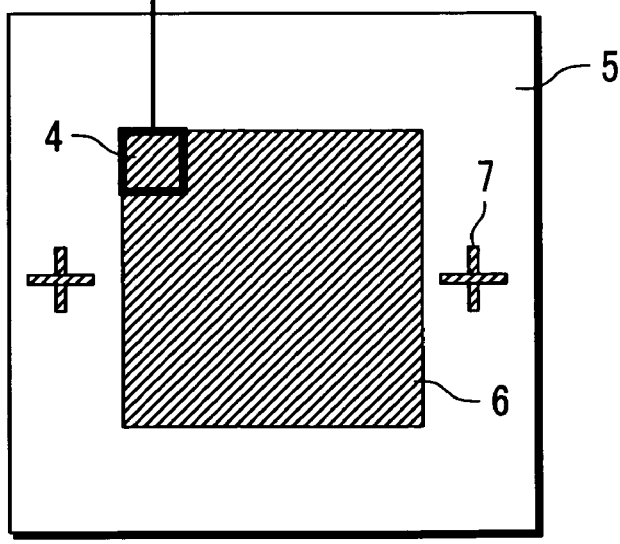
Figure 3:
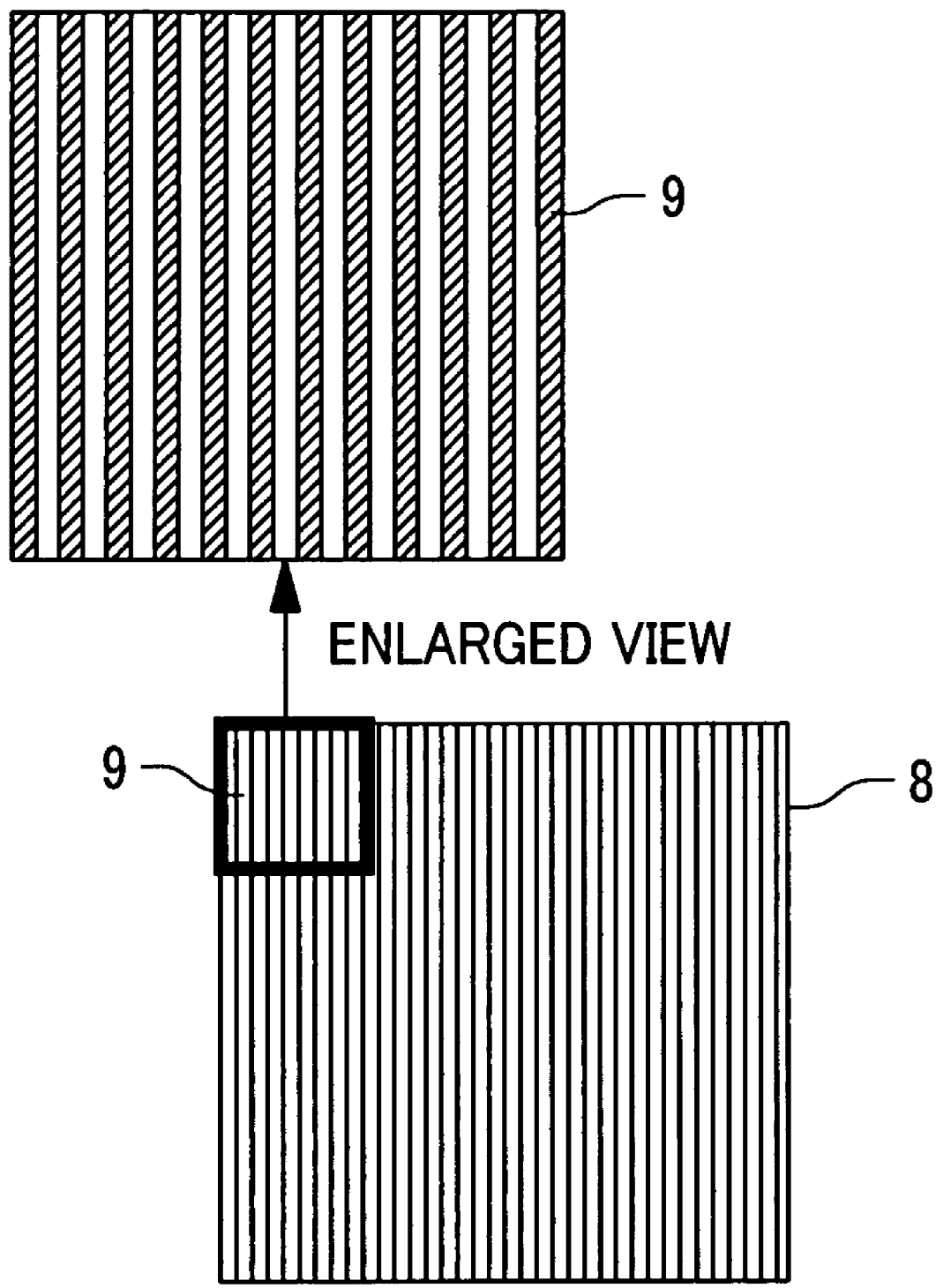
FIG. 3 is a view illustrating the conventional standard component for calibration.

An example of a dimension standard component for an electron-beam metrology system of this invention is shown in FIG. 1 and FIG. 2. FIG. 3 shows the conventional dimension standard component for the electron-beam metrology system.

Conventionally, a depression-and-projection pattern 15 on a semiconductor substrate of the (110) plane (for example, a silicon (Si) substrate, a compound semiconductor substrate, such as of GaAs and InP) has been fabricated by laser interferometer lithography method and wet chemical etching as a diffraction grating pattern in a fixed direction as shown in FIG. 3. The pitch dimension of the diffraction grating 9 is about 200 nm; this value has been found by the diffraction angle measurement using a laser. The pattern is uniformly formed all over the sample surface 8 of 4-mm square. In the case where the electron-beam metrology system is calibrated using this standard component, there are two problems below.

First, a first problem is fineness. As described above, the minimum processing dimensions go below 100 nm in the latest semiconductor patterns. However, in the conventional diffraction grating patterns by laser interferometer lithography, the minimum pitch dimension is 200 nm, and one pitch portion of the diffraction grating pattern could not be fitted in the field of view of an image at 200,000□Λ magnification or more at which the length of the semiconductor patterns are measured; therefore, dimension calibration at this magnification is impossible. The second problem is that, since the whole sample is a uniform pattern and there is no alignment mark within the sample, calibration positions cannot be specified automatically. For this reason, in the electron-beam metrology system etc., the calibration is performed after an operator defined the position.

In this invention, the electron-beam batch exposure method was used as the pattern exposure method. Although this method can achieve patterning with a pitch dimension of equal to or less than 100 nm, optical diffraction angle measurement was difficult in diffraction gratings of this pitch dimension because of wavelength limit.

Consequently, in this invention, a diffraction grating pattern as shown in FIG. 1 was fabricated. This diffraction grating pattern is composed of a diffraction grating pattern (an array of first diffraction gratings) 1 each of whose diffraction gratings has a length of 3 μm and a pitch of 200 nm and a diffraction grating pattern (an array of second diffraction gratings) 2 each of whose diffraction gratings has a length of 0.5 μm and a pitch of 400 nm and is disposed in a central part of the diffraction grating pattern 1 as shown in FIG. 1. Moreover, cross marks 3 of a length of 0.5 μm for alignment are arranged in four corners surrounding the diffraction grating pattern 1. In the standard component shown in FIG. 2, the area of 5 μm squares consisting of these patterns, as a basic unit, is arranged repeatedly in both longitudinal and horizontal directions over 1-mm square to constitute a pattern array 4 as shown in an enlarged view of FIG. 2. Further, cross marks 7 for correcting sample rotation are arranged in four corners in the surrounding of this calibration pattern area 6.

Next, a method for producing the standard component of this invention will be described.

Figure 4:
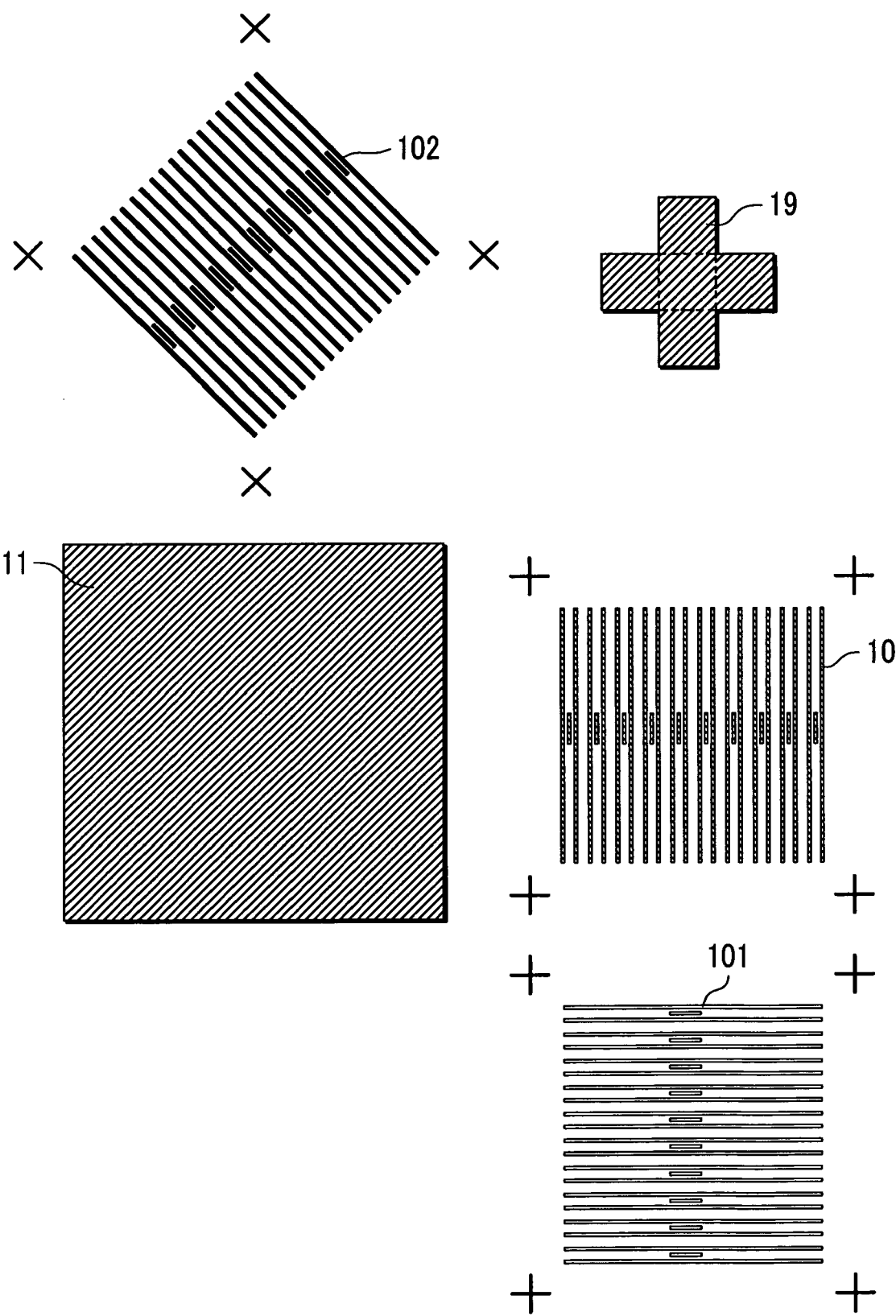
FIG. 4 is a view illustrating an example of a stencil mask for electron-beam batch exposure equipment used in this invention.

First, a thermal oxide film 100 nm thick or less is formed on a Si substrate having a surface whose plane direction is the (110) plane, and a resist is coated on the surface. Next, using electron-beam batch exposure equipment on which a stencil mask having apertures 10, 11 shown in FIG. 4 is loaded, the pattern aperture 10 for calibration is selected by beam deflection and exposure is conducted on the above-mentioned substrate with the use of beam deflection. Next, the marks 7 for sample rotation correction as shown in FIG. 2 are exposed by the electron-beam variable formation method on the right and left sides in the surrounding of an area on which the diffraction grating patterns were exposed using the rectangular aperture 11. After development, the oxide film is etched by using the resist as a mask, and subsequently subjected to anisotropic chemical etching with a potassium hydroxide aqueous solution.

Figure 8:
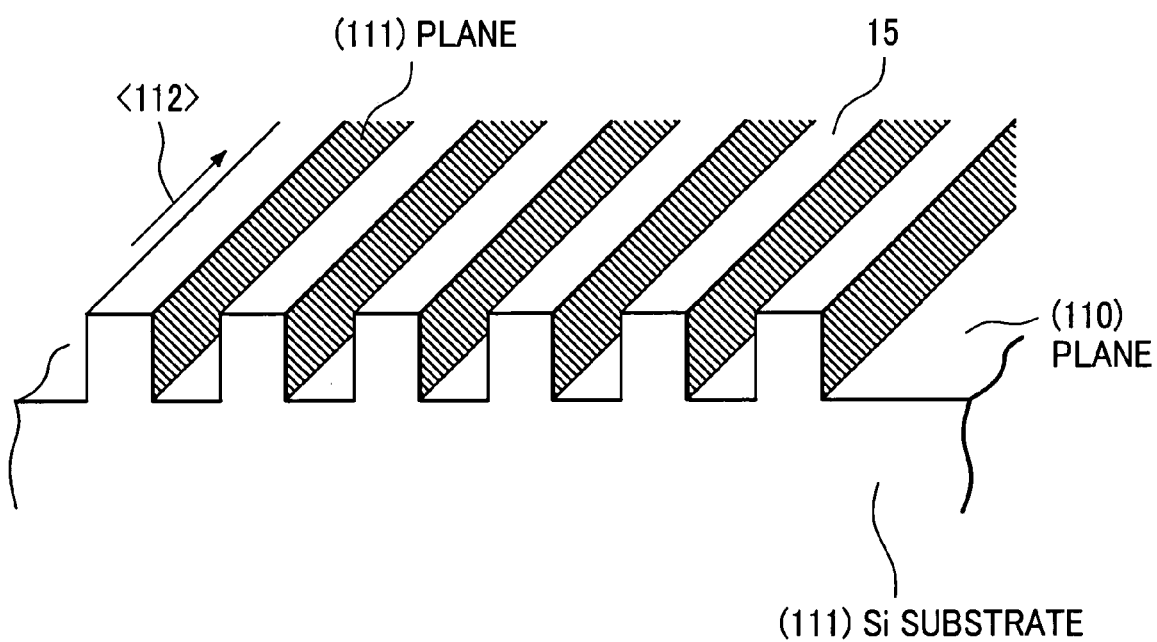
FIG. 8 is a view illustrating a diffraction-grating depression-and-projection pattern fabricated on a (110) Si substrate by wet chemical etching.

In the above-mentioned electron beam exposure, a direction of the diffraction grating pattern is set to the <112> direction on the (110) Si substrate, whereby from the above-mentioned pattern, anisotropic chemical etching will give a depression-and-projection shape whose vertical cross section consists of (110) and (111) crystallographic planes and has small edge roughness, like the diffraction grating pattern 15 of FIG. 8. Since the electron-beam batch exposure method is used as a diffraction grating pattern, exposure is done by using the same stencil mask for any position in the sample; therefore, uniform pattern formation with variation in dimension of 5 nm or less is possible.

For absolute dimensional calibration of this standard component, diffraction angle measurement using a laser was employed. A pitch dimension of 200.00 nm with precision of 1 nm or less was able to be found by irradiating narrowly converged He—Cd laser light onto a diffraction grating pattern area 6 of 1-mm square in the above-mentioned standard component and measuring its diffraction angle.

Next, a method of calibrating the electron-beam metrology system using the standard component according to this invention will be described.

Figure 5:
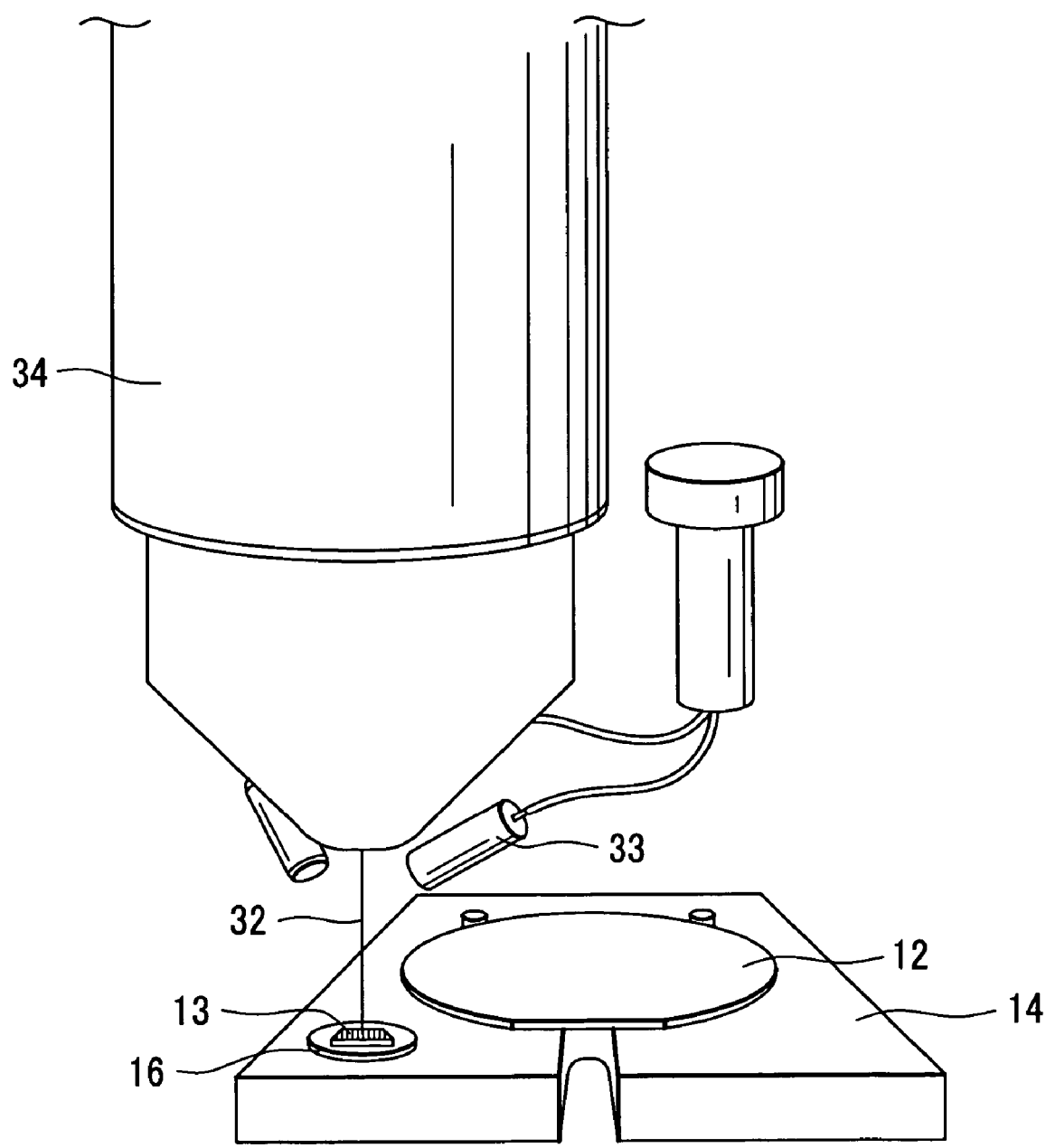
FIG. 5 is a view illustrating an outline configuration of an electron-beam metrology system on which a standard component for length measurement according to this invention is loaded.

As shown in FIG. 5, a standard component 13 is mounted on the holder 16, and subsequently placed on a stage 14 of the electron-beam metrology system. First, in order that an electron beam 32 emitted from an electron-beam lens-barrel 34 is irradiated on the standard component 13 having a diffraction grating pattern as shown in FIG. 1, the stage 14 is moved.

Figure 9:
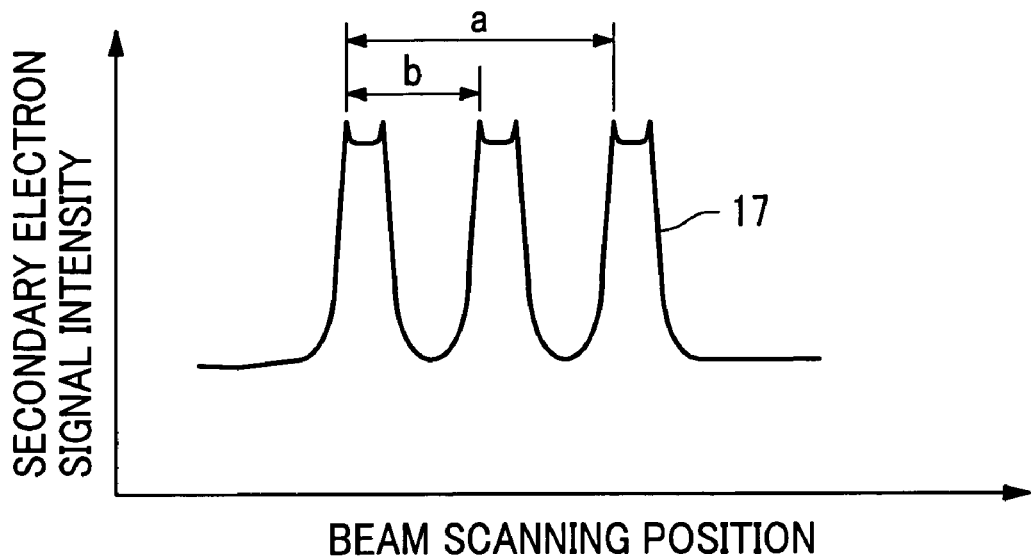
FIG. 9 is a diagram showing a secondary electron signal waveform at 100,000□Λ magnification by the embodiment of FIG. 1.

At 100,000□A magnification, the electron beam 32 is scanned in the scan position B shown in FIG. 1, and a secondary electron signal waveform is obtained with a secondary electron detector 33. FIG. 9 shows a secondary electron signal waveform 17 obtained. A pitch dimension a of the diffraction grating is found from this secondary electron signal waveform 17. Similar measurements are conducted at ten or more points on the same standard component, and the average of the pitch dimension is calculated. This average value is converted to a value of a pitch dimension of 200.00 nm that was found from the optical diffraction angle, whereby the electron-beam metrology system can be calibrated at 100,000□A magnification. Next, the pitch dimension b between two diffraction grating patterns that exist in the same field of view is found at the same 100,000□A magnification. The pitch dimension b between the two diffraction grating patterns was found 100.05 nm from the secondary electron signal waveform 17 shown in FIG. 9.

Figure 10:
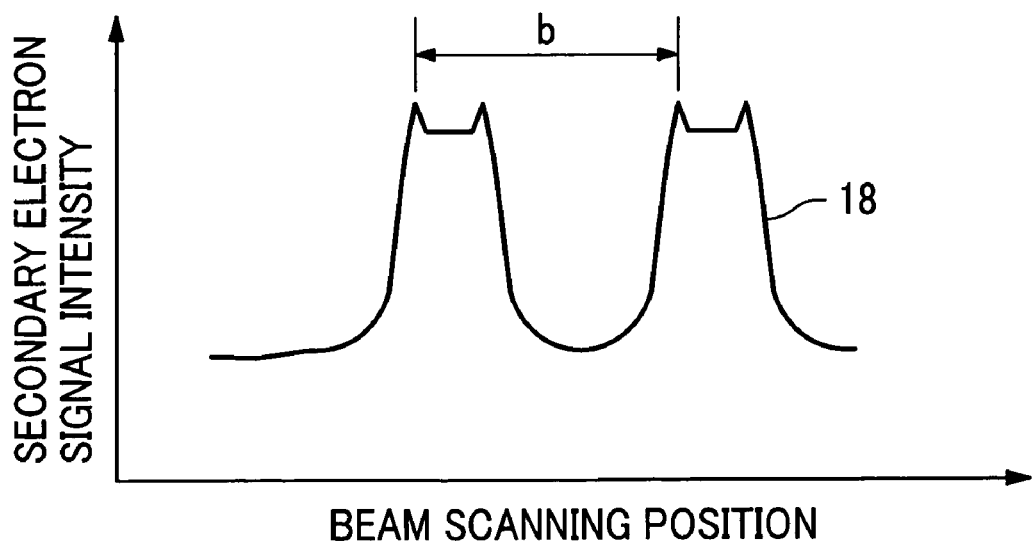
FIG. 10 is a diagram showing a secondary electron signal waveform at 200,000□Λ magnification by the embodiment of FIG. 1.

Next, calibration at 200,000□A magnification was performed. At this magnification, since one pitch amount of the diffraction grating 1 shown in FIG. 1 does not fit in deflection of the measuring beam even when the secondary electron signal waveform is obtained by scanning an electron beam onto the diffraction grating pattern, the pitch dimension of the diffraction grating measured optically cannot be found. Then, by scanning an electron beam on the diffraction grating pattern in the scan position B, a secondary electron signal waveform 18 as shown in FIG. 10 was obtained. Since the pitch dimension b was found from this secondary signal waveform 18, calibration of the electron-beam metrology system at 200,000□A magnification was able to be performed by converting this value to a value of 100.05 nm that was found at 100,000□A magnification.

After the calibration, the stage moved the semiconductor pattern formed on a wafer 12 to the measurement position, and the pattern dimension of 67 nm was able to be found by measuring it at 200,000□A magnification that is most suitable to dimensional measurement of this pattern and thereby it was successfully checked that high-precision processing relative to a designed dimension 65 nm was achieved.

Next, an automatic calibration method of the electron-beam metrology system using the standard component of this invention will be described.

As shown in FIG. 5, the standard component 13 for calibration mounted on the stage of the electron-beam metrology system is moved just under the electron-beam lens-barrel 34, and the electron beam 32 is irradiated onto it. Then, the cross marks 7 for sample rotation correction, as shown in FIG. 2, on the right and left sides of the standard component 13 for calibration are detected, a rotation value of a sample pattern with respect to the stage is found, and it is memorized in memory of the metrology system. Next, a horizontal and longitudinal coordinate system is corrected for a sample pattern based on the above-mentioned memorized rotation value, and the stage is moved, the cross marks 3 for alignment arranged at four corners in the surrounding of the diffraction grating pattern 1 shown in FIG. 1 are detected by electron beam scanning of the electron-beam metrology system, and a precise position of each diffraction grating is registered in the electron-beam metrology system. The cross mark 3 for alignment was automatically detected based on the above-mentioned registered data by conducting these operations, a desired pattern within the standard component was detected by pattern recognition, whereby a diffraction grating pattern on any position on the sample was able to be automatically detected with excellent reproducibility and with precision of 50 nm or less.

Next, a calibration procedure of movement to a diffraction grating pattern, beam scanning on the diffraction grating, grabbing the secondary electron signal waveform, measurement of the pitch dimension, and conversion thereof to the calibration value was programmed in a control computer of the electron-beam metrology system along with a procedure of the above-mentioned alignment. Thus, a series of steps of the electron-beam metrology system calibration was able to be performed automatically. In this occasion, the system was able to be programmed in such a manner that the number of irradiation of the diffraction grating pattern part onto which the beam was irradiated at the time of calibration was memorized in the above-mentioned program, and when it reached a fixed number, a position of the diffraction grating pattern was changed. In the case where measured values exhibit variation when the same location is used for calibration ten or more times in a preliminary experiment, measurement of the same location may be limited to, for example, about five times, being less than ten times.

Since such calibration was performed cyclically and performance was maintained by system management, patterns in almost all areas have been used after one year. By changing it with a new standard component, calibration management was able to be further performed continuously.

Figure 11:
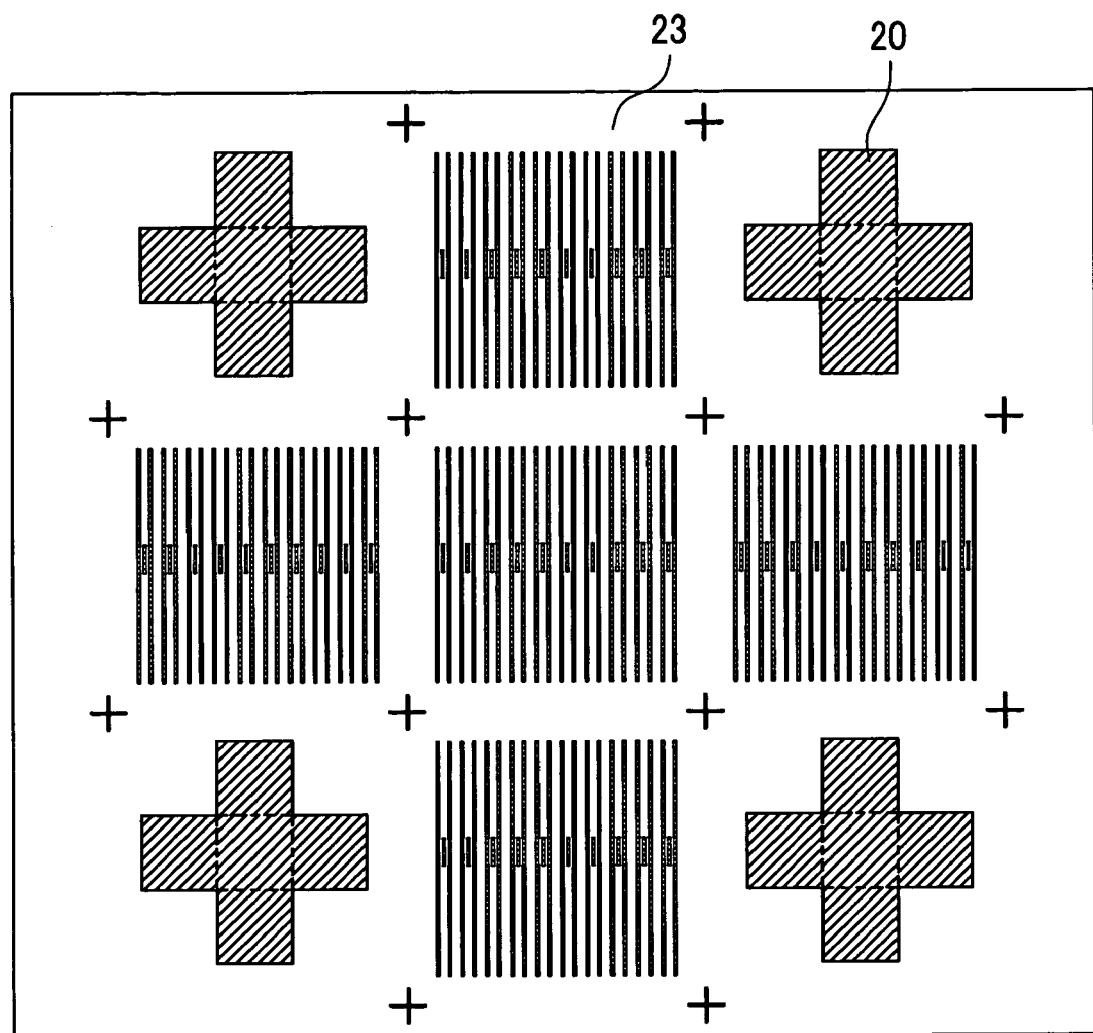
FIG. 11 is a view illustrating another example of a pattern array in the standard component for length measurement of this invention.
Figure 11:
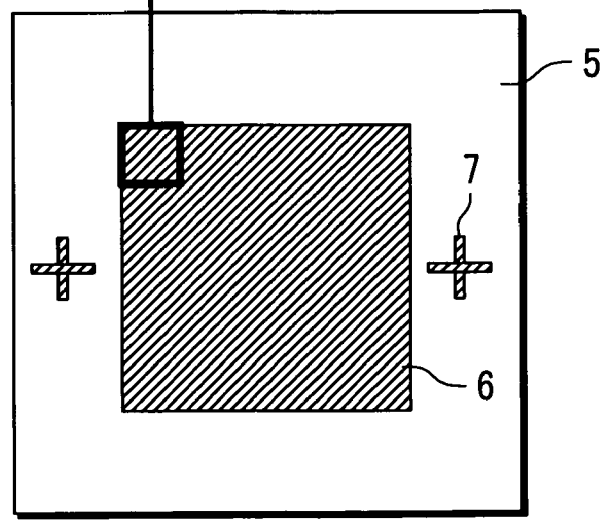

When the above-mentioned standard component was loaded on another electron-beam metrology system, there was a case where pattern recognition for alignment operated erroneously because the above-mentioned position detection pattern 3 was as fine as 0.5 nm in length. Consequently, large marks 20 each having a line width of 1 μm and a length of 3 μm were arranged so that position detection was able to be done at low magnification of the order of 10,000 times. Concretely, a standard component 5 was produced that has a pattern consisting of the large marks 20 each having a line width of 1 μm and a length of 3 μm are arranged between a diffraction grating pattern 23 and the next diffraction grating pattern, as shown in FIG. 11, in periodical positions by patterning using the electron-beam batch exposure method with an aperture 19 on the stencil mask selected, as shown in FIG. 4. By conducting an alignment operation at 10,000□Å magnification using this standard component 5, automatic calibration free from pattern recognition error was enabled. Note that in FIG. 11, only one diffraction grating pattern is shown between the mark 20 and the next mark 20, but the following pattern structure may be adopted: the above-mentioned mark 20 is arranged once cyclically after a plurality of diffraction grating patterns 20 continues.

Figure 6:
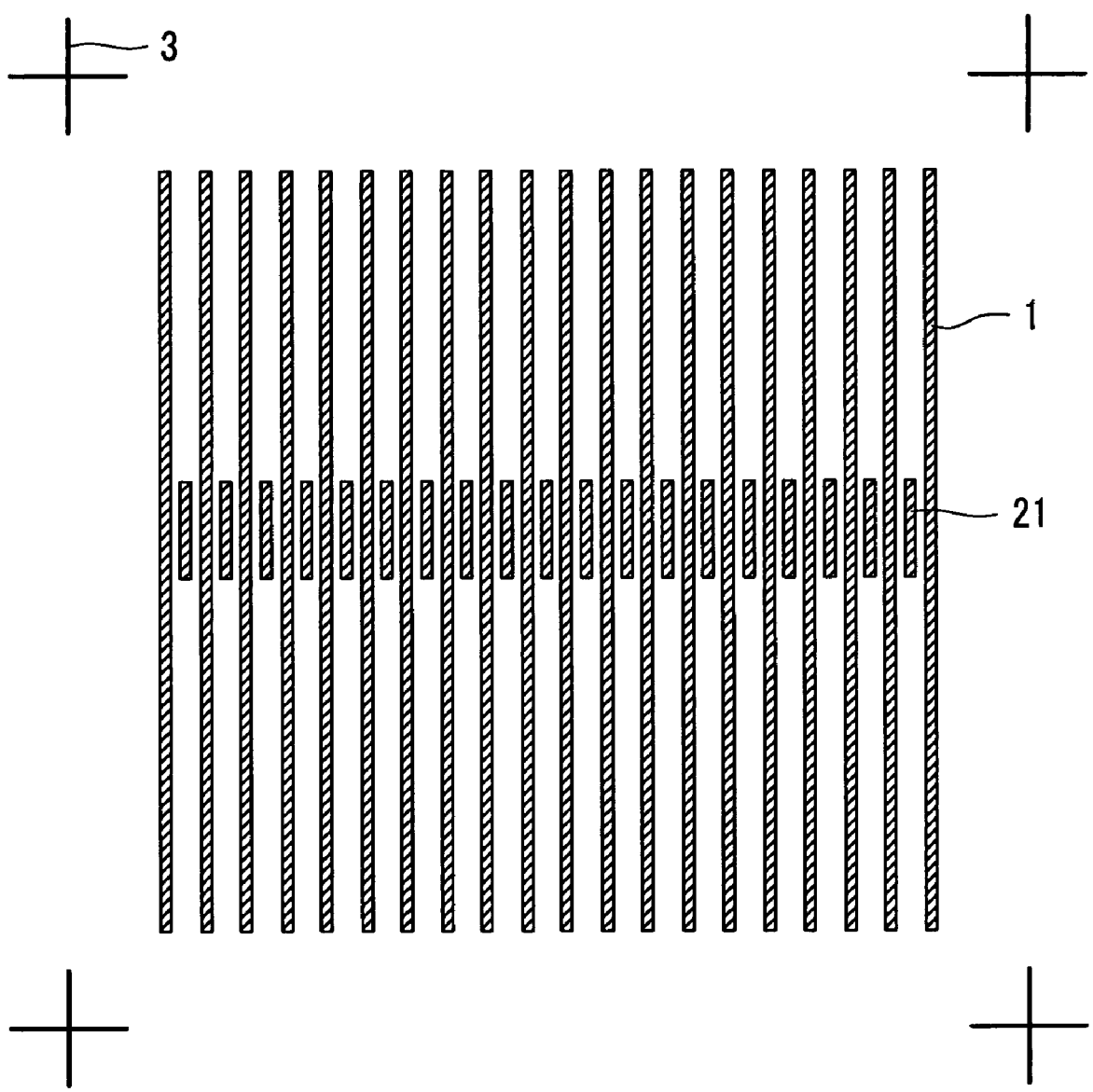
FIG. 6 is a view illustrating an other example of the pattern for calibration used for the standard component for length measurement of this invention.
Figure 7:
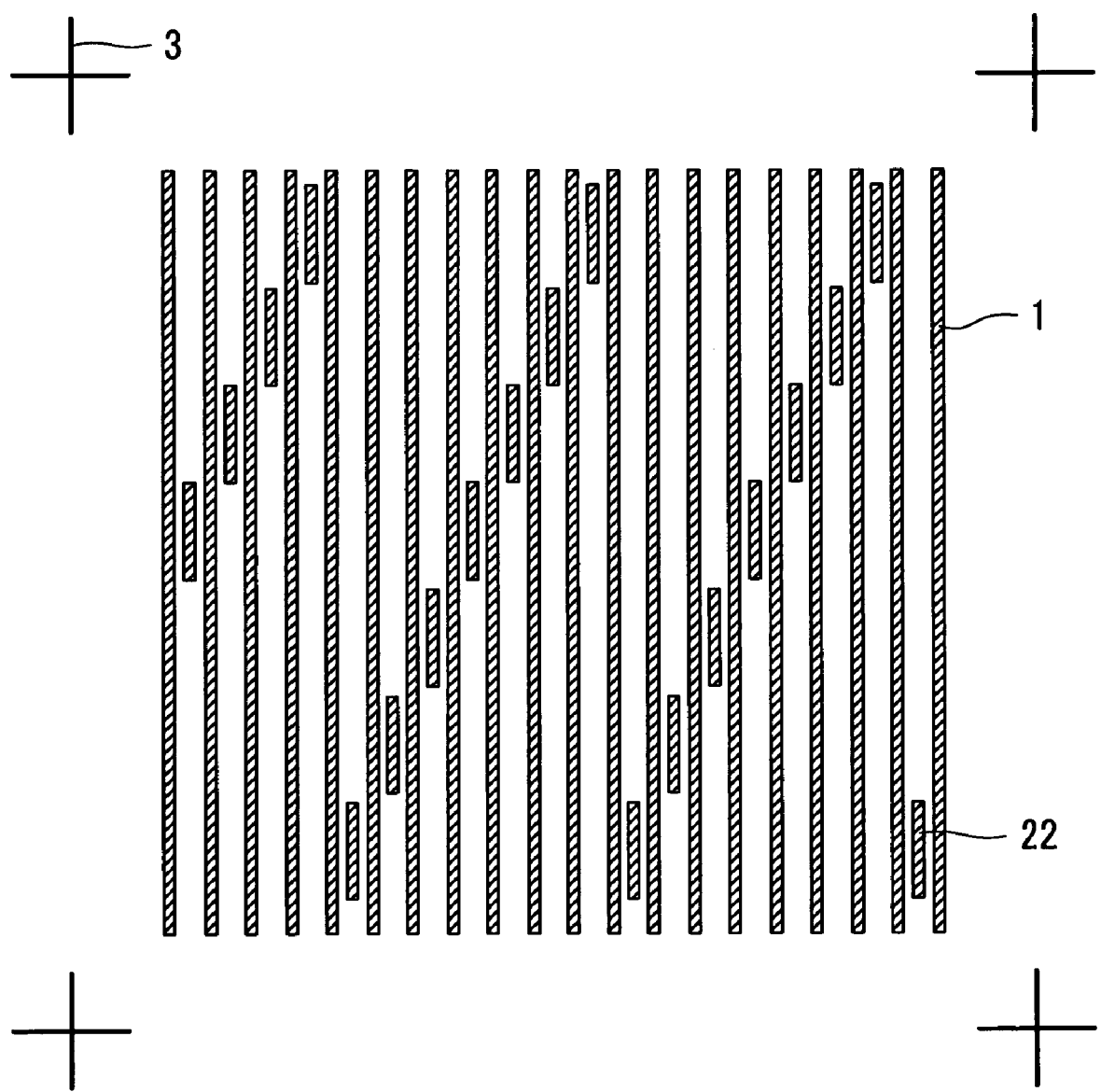
FIG. 7 is a view illustrating a further another example of the pattern for calibration used for the standard component for length measurement of this invention.

Although in this embodiment, the diffraction grating pattern as shown in FIG. 1 was used. However, patterns 21, 22 different from a diffraction grating used for optical diffraction angle measurement, as shown in FIGS. 6 and 7, in pitch dimension or repeating direction produced the similar result.

Figure 12:
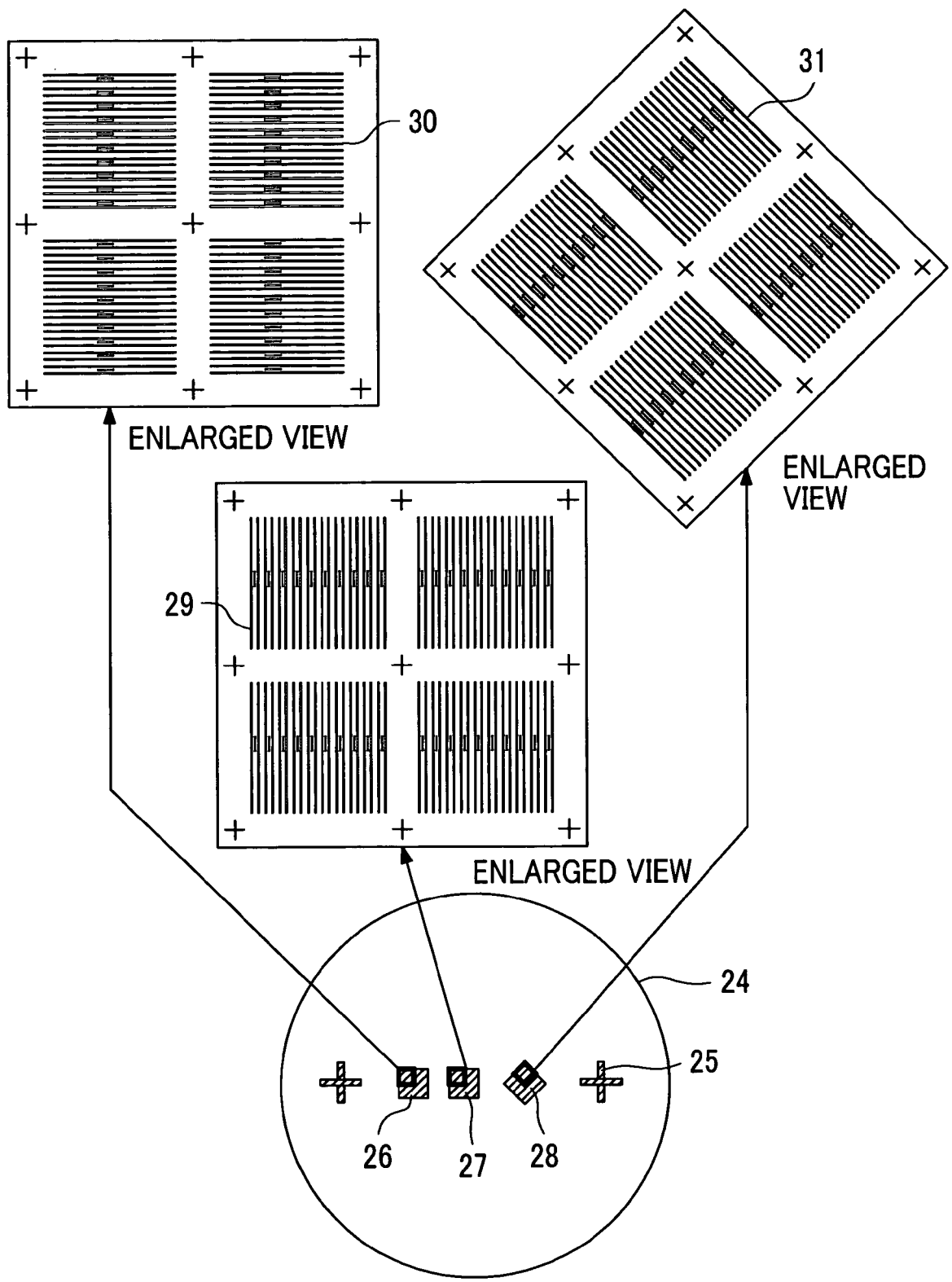
FIG. 12 is a view illustrating another example of the standard component for length measurement of this invention.

Next, an embodiment of a standard component having a wafer shape will be described. After coating a resist on an 8-inch (100) Si wafer, the aperture 10 on the stencil mask shown in FIG. 4 is chosen. As shown in FIG. 12, a group of patterns 29 that contains longitudinal-direction diffraction grating patterns and marks for position detection are exposed on an area 27 of 1-mm square on a wafer 24 by the electron-beam batch exposure method. Further, an aperture 101 on the stencil mask shown in FIG. 4 is chosen, and a group of patterns 30 that contains a horizontal-direction diffraction grating patterns and marks for position detection are exposed on an area 26 of 1-mm square on the wafer by the electron-beam batch exposure method. Furthermore, an aperture 102 on the stencil mask shown in FIG. 4 is chosen, and a group of patterns 31 that contains in the 45-degree direction horizontal-direction diffraction grating patterns and marks for position detection are exposed on an area 28 of 1-mm square on the wafer 24 by the electron-beam batch exposure method.

Next, a step 0.1 μm deep is formed on the Si wafer using these resist pattern by Si dry etching. In this etching, the step that has an angle of 80 degrees or more, close to a vertical plane, was formed in any of cross-sections of the diffraction gratings 29, 30, 31 in the longitudinal, horizontal, and oblique directions. Calibration was performed with the 8-inch wafer-shaped standard component 24 containing these patterns loaded in the electron-beam metrology system.

Figure 13:
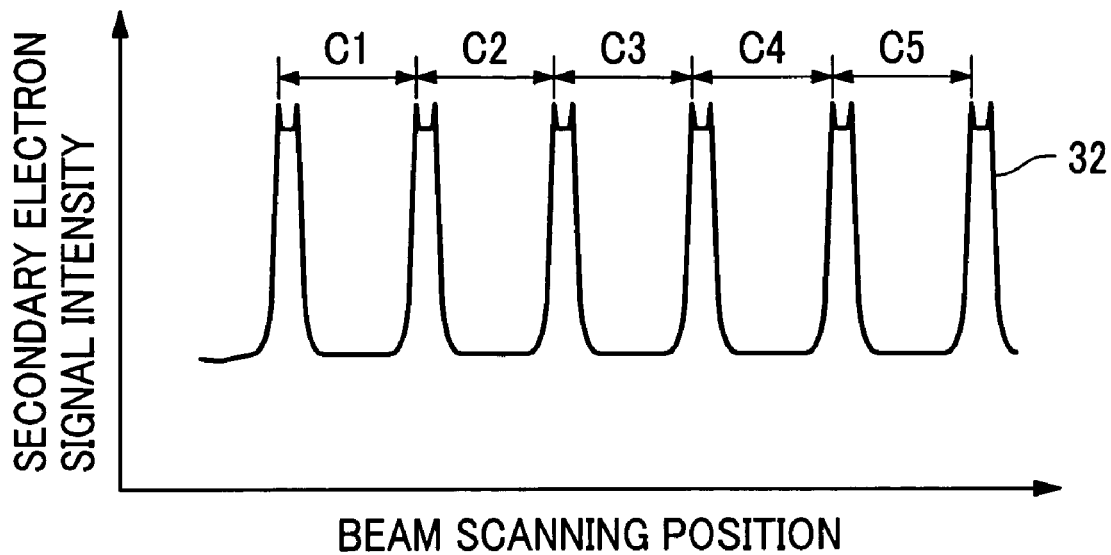
FIG. 13 is a view showing a secondary electron signal waveform (electron beam A scan position) at 50,000□Λ magnification according to the embodiment of FIG. 12.

First, the stage 14 is moved so that the diffraction grating pattern 27 in the longitudinal direction of the standard component existing in a position of the wafer 12 of FIG. 5 is just under the electron beam 32. The diffraction grating pattern 27 is scanned horizontally with an electron beam at 50,000□Å magnification in the scan position A shown in FIG. 1 to obtain a secondary electron signal waveform. FIG. 13 shows a secondary electron signal waveform 32 obtained. Pitch dimensions $c_1$ to $c_5$ are found from intervals of peaks of this secondary electron signal waveform 32, and an average value c of these values is found. This average value was converted to a value of a pitch dimension 200.00 nm found from optical diffraction angle, whereby calibration of the electron-beam metrology system at 50,000□Å magnification was able to be performed with a fewer number of beam scanning.

Figure 14:
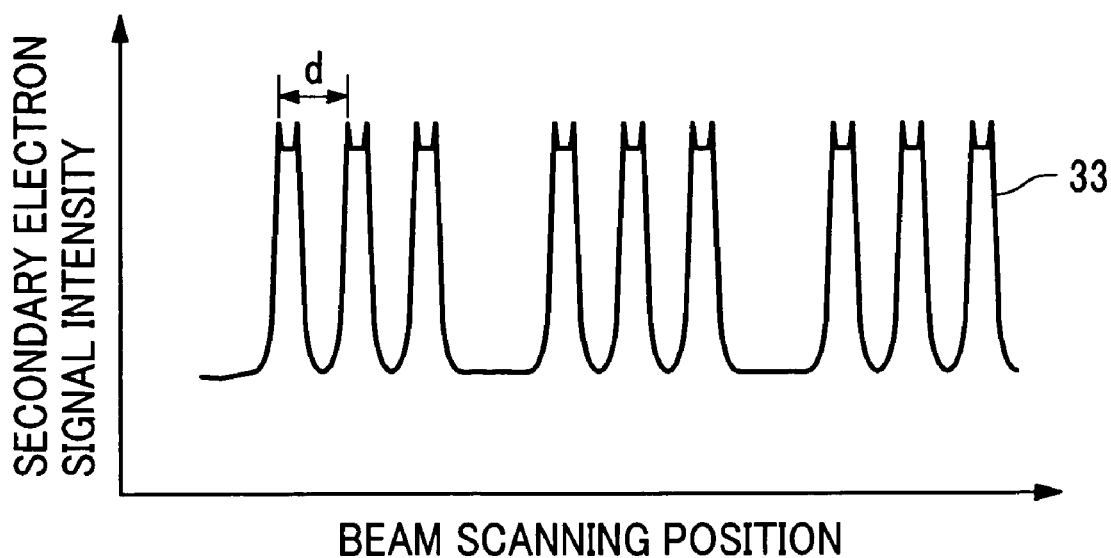
FIG. 14 is a view showing a secondary electron signal waveform (electron beam B scan position) at 50,000□Λ magnification according to the embodiment of FIG. 12.

Next, an electron beam is scanned on two diffraction grating patterns existing in the same field of view at the same 50,000□Å magnification in the scan position B shown FIG. 1 to obtain a secondary electron signal waveform 33 shown in FIG. 14. A pitch dimension d between the two diffraction grating patterns was found as 100.05 nm from this secondary electron signal waveform 33.

Next, the stage is moved so that the diffraction grating pattern 26 existing in a horizontal direction of the standard component 24 is just under the electron beam. At 50,000□Å magnification, an electron beam is scanned longitudinally to obtain a secondary electron signal waveform. Similarly as in the longitudinal direction, pitch dimensions are found from respective intervals between peaks of this signal waveform and an average value c of these values is calculated. This average value was converted to a value of a pitch dimension 200.00 nm found from optical diffraction angle, whereby calibration of the electron-beam metrology system at 50,000□Å magnification was able to be performed with a fewer number of beam scanning. Next, from a secondary electron signal waveform obtained by scanning an electron beam on the two diffraction grating patterns existing within the same field of view at 50,000□Å magnification, the pitch dimension d between the two diffraction grating patterns was found 100.08 nm.

Subsequently, the stage is moved in such a way that the diffraction grating 28 whose grating angle lies in a 45 degrees of the standard component 24 is just under the electron beam. At 50,000□Λ magnification, an electron beam is scanned in a 45 degree direction to obtain a secondary electron signal waveform. Similarly, pitch dimensions are found from intervals of respective peaks of this signal waveform, and an average c of these values is found. This average value was converted to a value of a pitch dimension of 200.00 nm that was found from the optical diffraction angle, whereby the electron-beam metrology system was able to be calibrated at 50,000□Λ magnification in a fewer number of scanning. Next, at the same 50,000□Λ magnification, two diffraction grating patterns existing in the same field of view are scanned with an electron beam to obtain secondary electron signal waveforms. From these signal waveforms, a pitch dimension d between two diffraction grating patterns was calculated to be 100.02 nm.

In this way, dimensional calibration for beam deflection in a plurality of directions was able to be performed using one standard component. The wafer-shaped standard component was taken out of the system and a wafer on which a semiconductor pattern on which the operator intends to conduct length measurement was inserted therein. A length measurement value in a longitudinal-direction pattern at 50,000□Λ magnification was calibrated with a pitch dimension of 200.00 nm. In the case of higher magnification than the above, calibration was performed with a pitch dimension between diffraction grating patterns (d=100.05 nm). Similarly, for a pattern in the horizontal direction and a pattern in a 45 degree direction, precise length-measured values were obtained based on respective calibration. In this calibration method, the wafer-shaped standard component was kept outside the system, and when calibrating the system, the standard component was inserted into the electron-beam metrology system appropriately and the calibration was performed.

In the above-mentioned case, the cross mark was used as a pattern for position detection. However, the similar effect can be obtained in this invention with any pattern as long as it allows a coordinate position of the mark to be specified.

Although, in the above-mentioned embodiment, explanation was done by taking as an example the calibration of the electron-beam metrology system, this invention is also applicable to calibration of scanning type probe microscopes, such as an AFM (Atomic Force Microscope) and an STM (Scanning Tunnel Microscope).

Moreover, although in the above-mentioned embodiment, length measurement in the horizontal direction was described for the sample mounted on the holder; if two samples produced similarly are arranged in the holder so as to be orthogonal to each other, calibration of length measurement can be performed for patterns in the longitudinal and horizontal directions.

As described in the foregoing in detail, according to this invention, the standard component has a dimension less than optically measurable dimension, whereby dimensional calibration of an apparatus for measuring the next generation semiconductor patterns (such as critical dimension of the pattern or size of a pattern edge) that are equal to or less than 100 nm is possible. In addition, by using position detection patterns of the standard component, automatic system calibration is also possible.

INDUSTRIAL APPLICABILITY

According to this invention, the electron-beam length measuring technology can be achieved that makes possible calibration of fine dimensions less than a pitch dimension measurable by the optical diffraction angle measurement and automatic calibration; therefore, high-precision length measurement calibration that matches the next generation semiconductor processing can be realized.

The invention claimed is:

1. A standard component for length measurement, comprising a semiconductor component on which a pattern consisting of an array of first diffraction gratings whose pitch dimension is specified as an absolute dimension by an optical measurement method, wherein
   the pattern has a structure that contains an array of second diffraction gratings different from the first diffraction grating in a predetermined cycle in a portion within the array of the first diffraction gratings.

2. A standard component for length measurement, comprising a semiconductor component on which a pattern consisting of an array of first diffraction gratings whose pitch dimension is specified as an absolute dimension by an optical measurement method, wherein
   the pattern has a structure that contains an array of second diffraction grating that is different from the first diffraction gratings in terms of at least one of the length of a straight line part of the first diffraction grating, a pitch dimension of the array, and a direction in which the second diffraction gratings is repeated cyclically in such a way that the array of the second diffraction gratings is parallel to and within the array of the first diffraction gratings.

3. The standard component for length measurement according to claim 2, wherein
   the pattern contains an array pattern whose minimum pitch dimension is equal to or less than 100 nm.

4. The standard component for length measurement according to claim 2, wherein
   the first diffraction grating and the second diffraction grating have predetermined lengths and widths, respectively, and are arranged cyclically at predetermined intervals, respectively, and marks for specifying positions of the patterns are arranged in peripheral portions of the pattern.

5. The standard component for length measurement according to claim 2, wherein the semiconductor component is made up of a Si substrate, and the pattern is a depression-and-projection-shaped pattern that has surfaces of plane directions of the (110) plane and the (111) plane of the Si substrate.

6. A standard component for length measurement, comprising a semiconductor component on which plurality of patterns each consisting of an array of first diffraction gratings whose pitch dimension is specified as an absolute dimension by an optical measurement method, wherein
   each of the patterns has a structure that an array of second diffraction gratings different from the first diffraction gratings is arranged in a part within the array of the first diffraction gratings in a predetermined cycle.

7. The standard component for length measurement according to claim 6, wherein
   each of the patterns contains an array pattern whose minimum pitch dimension is equal to or less than 100 nm.

8. The standard component for length measurement according to claim 6, wherein the plurality of patterns are arranged two-dimensionally and cyclically at predetermined intervals within a predetermined area, and marks for position detection are arranged between the adjacent patterns of the plurality of patterns.

9. The standard component for length measurement according to claim 6, wherein
the semiconductor component is made up of a Si substrate, and the pattern is a depression-and-projection-shaped pattern that has surfaces whose plane directions are the (110) plane and the (111) plane of the Si substrate.

10. A method for producing a standard component for length measurement, comprising
the step of forming a pattern consisting of an array of first diffraction gratings whose pitch dimension is specified as an absolute dimension by an optical measurement method on a surface of a semiconductor component, and further comprising the step of forming an array of second diffraction gratings different from the first diffraction gratings in a predetermined cycle in a part within the array of the first diffraction gratings in the pattern by the electron-beam batch exposure method using a stencil mask.

11. The method for producing a standard component for length measurement according to claim 10, wherein
the pattern formed contains an array pattern whose minimum pitch dimension is equal to or less than 100 nm.

12. The method for producing a standard component for length measurement according to claim 10, wherein
a Si substrate is used as the semiconductor component, and the pattern formed is a depression-and-projection-shaped pattern that has surfaces whose plane directions are the (110) plane and the (111) plane of the Si substrate.

13. An electron-beam metrology system comprising:
electron beam length measuring means for measuring processing dimensions of a sample by irradiating and scanning an electron beam; and
calibrating means for calibrating a dimension based on a secondary electron signal waveform obtained by scanning the electron beam on a standard component for length measurement; wherein
the standard component for length measurement has an array of first diffraction gratings whose pitch dimension was specified by an optical measurement method as an absolute dimension, and has a pattern that contains an array of second diffraction gratings different from the first diffraction gratings in a fixed period and within the array of the first diffraction gratings.

14. The electron-beam metrology system according to claim 13, wherein the pattern contains an array pattern whose minimum pitch dimension is equal to or less than 100 nm.

15. The method for producing a standard component for length measurement according to claim 13, wherein
a Si substrate is used as the semiconductor substrate, and the pattern is a depression-and-projection-shaped pattern that has surfaces whose plane directions are the (110) plane and the (111) plane of the Si substrate.

* * * * *

UNITED STATES PATENT AND TRADEMARK OFFICE
CERTIFICATE OF CORRECTION

| | |
|---|---|
| PATENT NO. | : 7,365,306 B2 |
| APPLICATION NO. | : 10/544668 |
| DATED | : April 29, 2008 |
| INVENTOR(S) | : Nakayama et al. |

It is certified that error appears in the above-identified patent and that said Letters Patent is hereby corrected as shown below:

On the Title Page

Please delete:

"This patent is subject to a terminal disclaimer"

Signed and Sealed this

Twenty-third Day of September, 2008

JON W. DUDAS
*Director of the United States Patent and Trademark Office*